Figure 1:
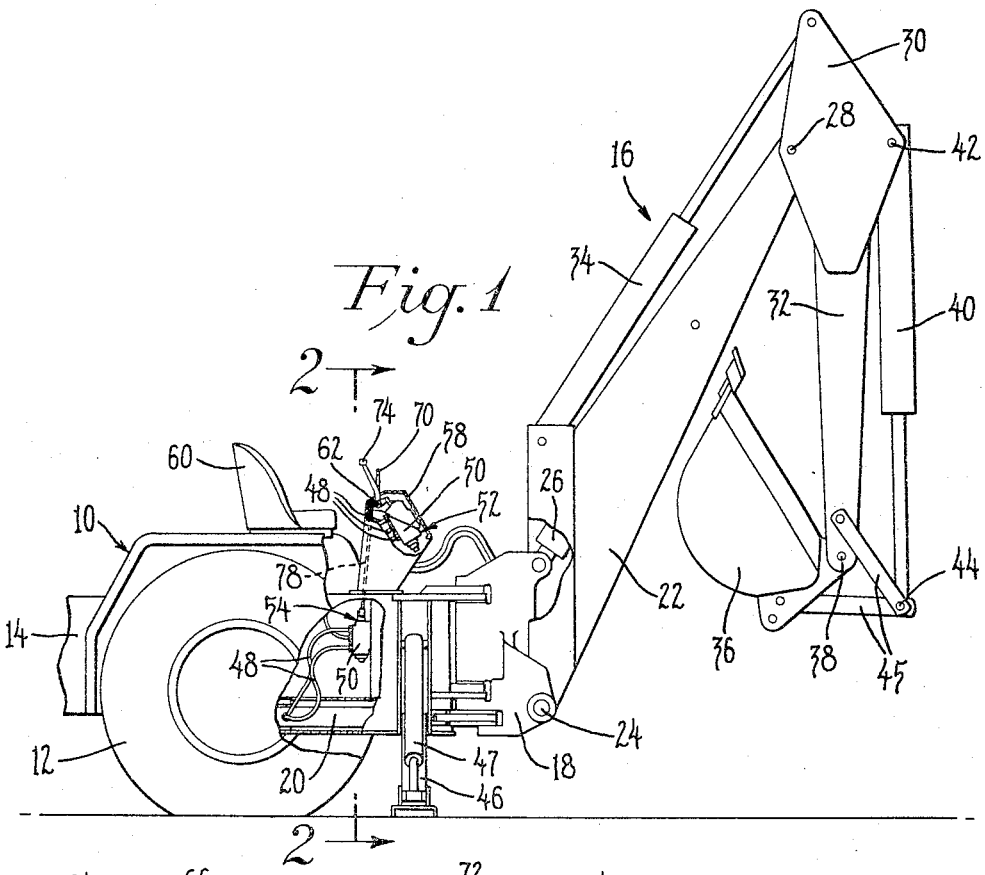
Figure 2:
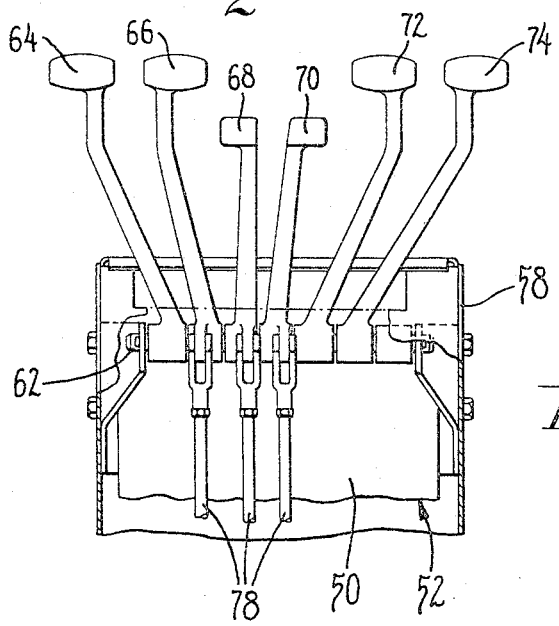
Figure 3:
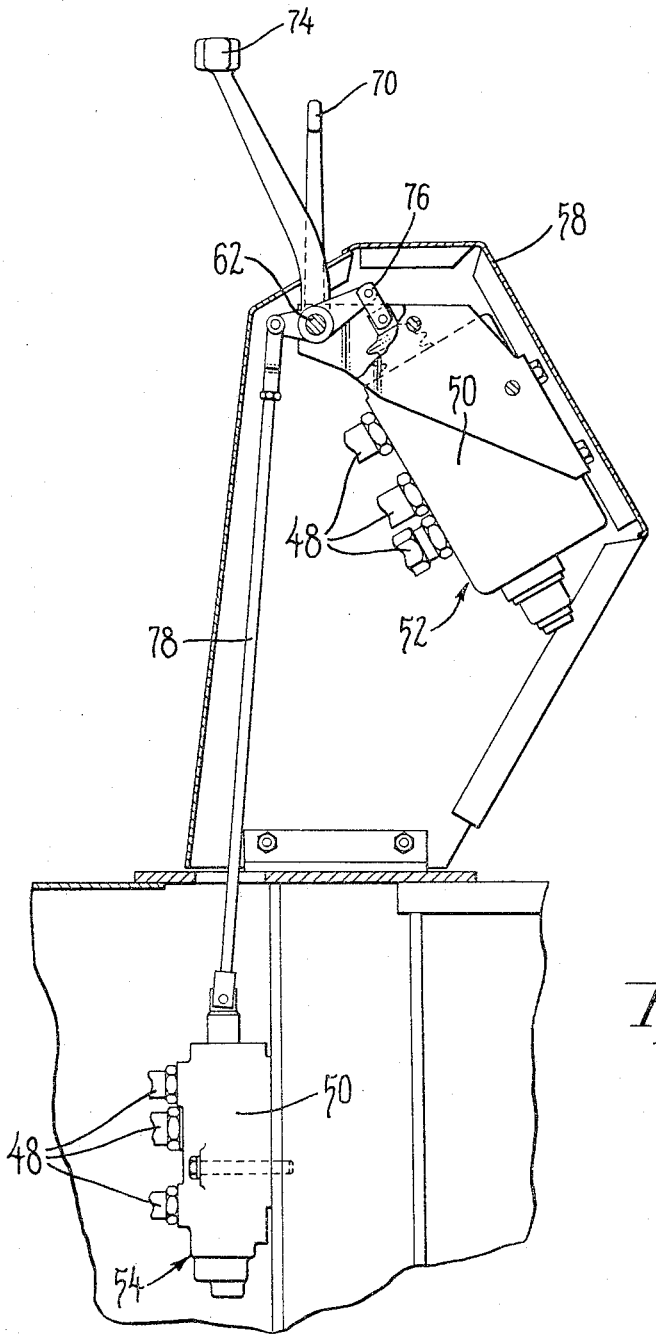

T 860,012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 679

742,600

BACKHOE CONTROL CONSOLE

George W. Bingley and Allyn C. Dowd, Stow, Ohio, assignors to Massey-Ferguson Inc., Des Moines, Iowa, a corporation of Maryland

Filed July 5, 1968. Published Mar. 18, 1969

Class 37—118

2 Sheets Drawing. 6 Pages Specification

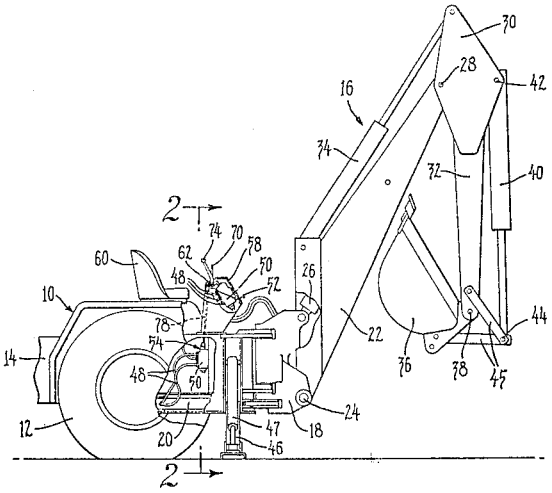

A tractor-mounted backhoe digging unit comprises conventional pivotally interconnected swing post, boom, dipperstick and bucket. Spaced stabilizers mounted at the rear of the tractor are extensible into ground engagement to stabilize the tractor during digging. Conventional hydraulic cylinders which are supplied by hydraulic pressure fluid from a tractor mounted source through a hydraulic circuit are provided for extending the stabilizers and for moving the swing post, boom, dipperstick and bucket. The hydraulic circuit includes control valves for operating the cylinders and which are each operated by a control lever. The boom, dipperstick and bucket valves are combined into a first valve unit which is located in a narrow compact control console mounted at the rear of the tractor adjacent the operator's seat. The swing and stabilizer valves are combined into a second valve unit located on the tractor beneath the control console and are connected to the valves by linkages. By both spacing the mounting of the valve units and mounting all control levers together on one shaft, the control console may be made sufficiently compact and narrow so that it may be straddled by the operator's legs, improve operator visibility and provide better access to the control levers.

T860,012

March 18, 1969 G. W. BINGLEY ET AL DEF. PUB.

BACKHOE CONTROL CONSOLE SN-742600

Filed July 5, 1968 Sheet 1 of 2

INVENTORS.
GEORGE W. BINGLEY
ALLYN C. DOWD
BY Tweedale & Gerhardt
ATTORNEYS.

T 860,012

March 18, 1969 G. W. BINGLEY ET AL DEF. PUB.

BACKHOE CONTROL CONSOLE

SN 742600

Filed July 5, 1968 Sheet 2 of 2

INVENTORS.
GEORGE W. BINGLEY
ALLYN C. DOWD
BY Tweedale & Gerhardt
ATTORNEYS.